United States Patent Office 3,218,322
Patented Nov. 16, 1965

3,218,322
PIPERAZINE DERIVATIVES
Harold D. Orloff, Oak Park, Mich., assignor to Ethyl Corporation, New York, N.Y., a corporation of Virginia
No Drawing. Filed June 7, 1962, Ser. No. 200,624
4 Claims. (Cl. 260—268)

This invention relates to novel and useful chemical compounds and the preparation and uses thereof. Specifically this invention relates to α,α'-(1,4-piperazinediyl)bis-(2,6-dialkyl-p-cresol) compounds, their preparation from 2,6-dialkylphenols and their uses as antioxidants.

In the past benzyl amines have been suggested for use as antioxidants for various organic media. Their acceptance has been limited due to many and variable factors, such as volatility, compatibility, solubility and others. In order to obtain a soluble antioxidant, benzyl amine was substituted with bulky and large alkyl or aralkyl groups. While this aided the solubility it reduced the effectiveness on a per pound basis and also resulted in a larger cost per pound. Clearly then an effective antioxidant for use in those areas for which benzyl amines have been found to be suitable is needed. The antioxidant must be of a large enough molecular weight to be soluble and substantially non-volatile and also be easily prepared at low cost.

Accordingly, an object of this invention is to provide novel and useful chemical compounds. Another object is to provide novel and useful benzyl piperazine compounds which are easy to prepare, low in cost, have a high degree of solubility and have low volatility. A further object is to provide novel and useful α,α'-(1,4-piperazinediyl)bis(2,6-dialkyl-p-cresol) compounds. Still another object is to provide a process of preparing the novel piperazine p-cresols of this invention. A still further object is to provide improved compositions of matter containing the various compounds of this invention. A specific object is to provide lubricating oil stabilized against oxidative deterioration. Other important objects of this invention will be apparent from the following description.

According to this invention the above and other objects are accomplished by providing, as a new composition of matter, a compound having the formula:

I. 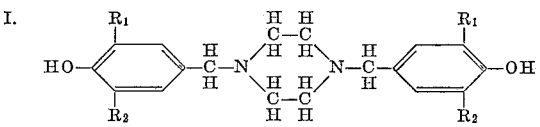

wherein R₁ and R₂ are selected from the group consisting of alkyl of from 1–20 carbon atoms and aralkyl of from 7–20 carbon atoms.

The compounds of this invention are generally white to yellow crystalline solids. They are insoluble in water, soluble in hydrocarbon, ashless and non-volatile, thus facilitating their incorporation into a wide variety of organic material. They are excellent antioxidants in a wide variety of organic media and are also highly useful as chemical intermediates, reacting, for example, with sulfur to produce other highly potent antioxidants.

Examples of compounds of this invention include:

α,α'-(1,4-piperazinediyl)bis(2,6-di-n-hexyl-p-cresol),
α,α'-(1,4-piperazinediyl)bis(2-ethyl-6-methyl-p-cresol),
α,α'-(1,4-piperazinediyl)bis(2-benzyl-6-sec-butyl-p-cresol),
α,α'-(1,4-piperazinediyl)bis[2,6-di-(α-ethylhexyl)-p-cresol],
α,α'-(1,4-piperazinediyl)bis[2,6-di-(α-n-butylbenzyl)p-cresol],
α,α'-(1,4-piperazinediyl)bis[2-(3,5-di-n-hexyl-α-methyl-benzyl)-6-n-nonyl-p-cresol],
α,α'-(1,4-piperazinediyl)bis[2-(α-n-propylbenzyl)-6-n-dodecyl-p-cresol],
α,α'-(1,4-piperazinediyl)bis(2-hexadecyl-6-α-methyl-benzyl-p-cresol),
α,α'-(1,4-piperazinediyl)bis(2,6-di-n-eicosyl-p-cresol),
α,α'-(1,4-piperazinediyl)bis[2,6-di-(α,α-dimethyl-benzyl)-p-cresol] and
α,α'-(1,4-piperazinediyl)bis(2,6-dimethyl-p-cresol).

A preferred embodiment of this invention consists of compounds of the above formula wherein R₁ is an alkyl group of from 1–12 carbon atoms and R₂ is an alpha-branched alkyl group of from 3–12 carbon atoms. These are preferred because of their ease of preparation, their excellent antioxidant properties and, notably, their wide range of use as intermediates. Among the compounds represented by this preferred embodiment are:

α,α'-(1,4-piperazinediyl)bis(2-hexyl-6-isopropyl-p-cresol),
α,α'-(1,4-piperazinediyl)bis(2-tert-butyl-6-methyl-p-cresol),
α,α'-(1,4-piperazinediyl)bis(2,6-di-tert-butyl-p-cresol),
α,α'-(1,4-piperazinediyl)bis(2,6-di-isopropyl-p-cresol),
α,α'-(1,4-piperazinediyl)bis(2-isopropyl-6-methyl-p-cresol),
α,α'-(1,4-piperazinediyl)bis(2-sec-butyl-6-ethyl-p-cresol),
α,α'-(1,4-piperazinediyl)bis(2-n-amyl-6-tert-amyl-p-cresol),
α,α'-(1,4-piperazinediyl)bis[2,6-di-(α-ethyloctyl)-p-cresol],
α,α'-(1,4-piperazinediyl)bis[2-(α-methylhexyl)-6-n-nonyl-p-cresol], and
α,α'-(1,4-piperazinediyl)bis[2-(α-ethyldecyl)-6-n-dodecyl-p-cresol].

The most preferred compound of this invention is α,α'-(1,4-piperazinediyl)bis(2,6-di-tert-butyl-p-cresol) which is a most superior antioxidant in lubricating oil and other organic media, and is most particularly suitable for use as an intermediate in the preparation of other excellent antioxidants, which antioxidants can be incorporated into a wide range of organic media.

In one embodiment of this invention the compounds are prepared by reacting a compound having the formula:

II. 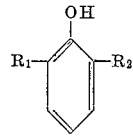

wherein R₁ and R₂ are as described following Formula I, with formaldehyde and piperazine. In conducting this process a monohydric alcohol containing from 1–6 carbon atoms is preferably used as the reaction solvent.

The temperatures employed with the reaction vary from about 20° C. to the reflux temperature of the highest boiling alcohol solvent, about 155° C., at reaction times of from a few minutes to one week or more to give a good yield of product. A preferred temperature range is from about 50° C. to about 90° C. This temperature range gives an excellent yield of product in a convenient length of time.

Although excellent results are obtained throughout the temperature and time limits stated above, preferred reaction times are from about one-half hour to about 6 hours. These reaction times give excellent results.

To obtain the elevated temperatures sometimes necessary in the reaction, pressure may be resorted to. However, with most reactants, atmospheric pressure is sufficient. Vacuum may be used when isolating the product such as distillation or when stripping the solvent. The product can be isolated by other means as well, such as by extraction by organic solvents, or by isolating the hydrochloride and subsequently reacting this salt with base to free the amine. The above reaction can be conducted either in the presence of air or under inert atmosphere such as nitrogen. Good results are also obtained by other methods.

The following examples, in which all parts and percentages are by weight, illustrate the compounds of this invention and their preparation according to the method outlined above.

*Example 1*

In a reaction vessel equipped with stirring means, heating means, temperature measuring means and a reflux condenser were placed 69.0 parts of 2,6-di-tert-butylphenol in 131 parts of isopropanol, 29.7 parts of 37 percent aqueous formaldehyde and 14.3 parts of piperazine. The reaction mixture was refluxed for 40 minutes during which time a large amount of white solid came out of the solution. The solid was filtered off to yield α,α'-(1,4-piperazinediyl)bis(2,6-di-tert-butyl-p-cresol) which, after recrystallization from isopropanol furnished white microcrystals having a melting point of 215.5–216.5° C. Analysis: Calculated for $C_{34}H_{54}O_2N_2$: 5.36 percent nitrogen. Found: 5.21 percent nitrogen.

Good results are also obtained when the other dialkyl phenols are reacted with formaldehyde and piperazine in the above manner. Thus, 2-(3',5'-di-n-hexyl-α-methylbenzyl)-6-n-nonylphenol can be reacted with piperazine and formaldehyde to produce α,α'-(1,4-piperazinediyl)bis[2 - (3',5'-di-n-hexyl-α-methylbenzyl)-6-n-nonyl-p-cresol]. Likewise, 2,6-di-(1-methyldecyl)phenol can be reacted with piperazine and formaldehyde to produce α,α' - (1,4 - piperazinediyl)bis[2,6 - di-(1-methyldecyl)-p-cresol].

*Example 2*

In a reaction vessel equipped with stirring means, heating means and temperature measuring means are placed 236 parts of 2-n-amyl-6-tert-amylphenol, 43 parts of piperazine and 81 parts of a 37 percent solution of aqueous formaldehyde in 500 parts of isopropanol. The reaction mixture is heated to 70° C. and kept at that temperature, with stirring, for 2 hours. The reaction mixture is stripped of isopropanol. The mixture is then extracted with ether and the ether solution washed with water and dried. The ether solution is then evaporated leaving an oil. This oil is dissolved in isopropanol from which crystallizes α,α'-(1,4-piperazinediyl)bis(2-n-amyl-6-tert-amyl-p-cresol).

Good results are also obtained when 2,6-di-tetradecylphenol is reacted with piperazine and formaldehyde as in the above example to produce α,α'-(1,4-piperazinediyl)bis(2,6-di-tetradecyl-p-cresol). Likewise, 2,6 - di-n-hexylphenol can be reacted with piperazine and formaldehyde to produce α,α'-(1,4-piperazinediyl)bis(2,6-di-n-hexyl-p-cresol).

*Example 3*

In a reaction vessel equipped with a stirrer, heating means, cooling means, and temperature measuring means are placed 216 parts of 2-n-dodecyl-6-(1-ethyldecyl)phenol, 40.5 parts of a 37 percent solution of aqueous formaldehyde and 22 parts of piperazine in 500 parts of methanol. The mixture is kept at 20° C. with stirring for one week. The mixture is then heated to distill off the methanol. The resulting oil is taken up with ether. The ether solution is treated with 6-n-hydrochloric acid and a solid precipitates which is filtered and washed with additional ether. This solid is recrystallized from methanol to give the hydrochloride salt of α,α'-(1,4-piperazinediyl)bis[2-n-dodecyl-6-(ethyldecyl)-p-cresol]. The hydrochloride is dissolved in ethanol and an excess of $Na_2CO_3$ is added. The mixture is heated until the alcohol is removed. The mixture is then extracted with ether. The ether is evaporated leaving oil. This oil is dissolved in n-butyl alcohol from which is crystallized and filtered α,α'-(1,4-piperazinediyl)bis[2-n-dodecyl-6-(1-ethyldecyl)-p-cresol].

In a similar manner, 2-n-decyl-6-n-dodecyl can be reacted with formaldehyde and piperazine to produce α,α'-(1,4 - piperazinediyl)bis(2 - n-decyl-6-n-dodecyl-p-cresol). Further, 2-isopropyl-6-methyl-phenol can be reacted with piperazine and formaldehyde to yield α,α'-(1,4-piperazinediyl)bis(2-isopropyl-6-methyl-p-cresol).

*Example 4*

In a reaction vessel equipped with stirring means, heating means, temperature measuring means and a reflux condenser are placed 330 parts of 2,6-di-(α,α-dimethylbenzyl)phenol, 43 parts of piperazine and 81 parts of a 37 percent solution of aqueous formaldehyde in 700 parts of isoamyl alcohol. The mixture is heated to reflux and stirred at reflux for one-half hour whereupon a precipitate forms. The precipitate is filtered and recrystallized from ethanol to yield α,α'-(1,4-piperazinediyl)bis[2,6-di-(α,α-dimethylbenzyl)-p-cresol].

Further good results are obtained when 2-(α-methylbenzyl)-6-sec-butylphenol is reacted with piperazine and formaldehyde to produce α,α'-(1,4-piperazinediyl)bis[2-(α-methylbenzyl)-6-sec-butyl-p-cresol]. Likewise, 2-ethyl-6-sec-butyl can be reacted with piperazine and formaldehyde to prepare α,α'-(1,4-piperazinediyl)bis(2-ethyl-6-sec-butyl-p-cresol).

*Example 5*

In a reaction vessel equipped with a stirrer, heating means and temperature measuring means are placed 328 parts of 2-tert-butyl-6-methylphenol, 81 parts of piperazine and 162 parts of a 37 percent solution of aqueous formaldehyde in 750 parts of n-hexyl alcohol. The mixture is heated to 155° C. with stirring for a few minutes whereupon a precipitate forms which is filtered, and recrystallized from isopropanol to yield α,α'-(1,4-piperazinediyl)bis(2-tert-butyl-6-methyl-p-cresol).

Further good results are achieved when 2-ethyl-6-methylphenol is reacted with formaldehyde and piperazine to produce α,α'-(1,4-piperazinediyl)bis(2-ethyl-6-methyl-p-cresol). Likewise, 2-n-hexyl-6-isopropylphenol can be reacted with formaldehyde and piperazine to yield α,α' - (1,4 - piperazinediyl)bis(2 - n-hexyl - 6-isopropyl-p-cresol).

*Example 6*

In a reaction vessel equipped with a stirrer, heating means and temperature measuring means are placed 178 parts of 2,6-diisopropylphenol, 43 parts of piperazine and 81 parts of a 37 percent solution of aqueous formaldehyde in 500 parts of ethanol. The mixture is heated to 50° C. and stirred at that temperature for 6 hours whereupon a precipitate forms. The precipitate is filtered and recrystallized from isopropanol to yield α,α'-(1,4-piperazinediyl)bis(2,6-diisopropyl-p-cresol).

Good results are also obtained when 2-(α-methylbenzyl)-6-n-hexadecylphenol is reacted with piperazine and formaldehyde to yield α,α'-(1,4-piperazinediyl)bis[2-(α-methylbenzyl) - 6-n-hexadecyl-p-cresol]. Also, 2,6-di-n-eicosylphenol can be reacted with formaldehyde and piperazine to yield α,α'-(1,4-piperazinediyl)bis(2,6-di-n-eicosyl-p-cresol).

*Example 7*

In a reaction vessel equipped with a stirrer, heating means and temperature measuring means are placed 106 parts of 2,6-di-n-octylphenol, 15 parts of piperazine and 27 parts of a 37 percent solution of aqueous formaldehyde in 250 parts of n-butyl alcohol. The mixture is heated to 90° C. and held at that temperature with stirring for 3 hours whereupon a precipitate forms which is filtered and recrystallized from n-butanol to yield α,α'-(1,4-piperazinediyl)bis(2,6-di-n-octyl-p-cresol).

Further good results are achieved when 2,6-di-(1-methylnonyl)phenol is reacted with formaldehyde and piperazine to yield α,α'-(1,4-piperazinediyl)bis[2,6-di-(1-methylnonyl)-p-cresol]. Likewise, 2-(1-methylhexyl)-6-n-nonylphenol can be reacted with formaldehyde and piperazine to yield α,α'-(1,4-piperazinediyl)bis[2-(1-methylhexyl)-6-n-nonyl-p-cresol].

The compounds of this invention are outstanding antioxidants. Therefore, an embodiment of this invention is a new composition of matter which comprises organic material normally tending to undergo oxidative deterioration in the presence of air, oxygen, or ozone, containing an appropriate quantity, from 0.001 up to about 5 percent, and preferably from about 0.25 to about 2 percent, of a compound having the Formula I above.

The compounds of this invention find important utility as antioxidants in a wide variety of oxygen-sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils, waxes, soaps and greases, plastics, synthetic polymers such as polyethylene and polypropylene, organometallic compositions such as tetraethyllead and tetraethyllead antiknock fluids, elastomers (including natural rubber), crankcase lubricating oils, lubricating greases, and the like, greatly increase their resistance to deterioration in the presence of air, oxygen or ozone.

The compounds of this invention are very useful in protecting petroleum wax—paraffin wax and micro-crystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus, one embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar processes, or is emulsified and the emulsions added to the rubber latex before coagulation. In the various embodiments of this invention the stabilizer is used in small amounts, generally ranging from about 0.01 to about 5.0 percent, based on the rubber.

The compounds of this invention are also useful in preventing oxidative deterioration in lubricating oil compositions. Thus, a preferred embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of a compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils. The following examples illustrate the preferred lubricating oil compositions of this invention.

*Example 8*

To show the useful properties of the novel compounds of this invention, recourse is had to the Polyveriform Oxidation Stability Test as described in the paper entitled "Factors Causing Lubricating Oil Deterioration in Engines," [Ind. and Eng. Chem., Anal. Ed. 17, 302 (1945)]. See also "A Bearing Corrosion Test for Lubricating Oils and Its Correlation with Engine Performance," [Al. Chem., 21, 737 (1949)]. This test effectively evaluates the performance of lubricating oil antioxidants. The test equipment procedure employed and correlations of the results with engine performance are discussed in the first paper cited above. By employing various compounds of this invention in oxygen-sensitive lubricating oil, effective inhibition of oxidative deterioration is achieved.

Comparative tests were conducted using the method and apparatus essentially as described in the publication first mentioned above. One minor modification was that the steel sleeve and copper test piece described in this publication were omitted from the apparatus. In these tests an initially additive-free 95 V.I. solvent refined SAE–10 crankcase oil was used. The principal test conditions consisted of passing 50 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of the oil employed.

Lubricating oils of this invention were prepared by blending 1 percent by weight of α,α'-(1,4-piperazinediyl)bis(2,6-di-tert-butyl-p-cresol) with the oil described above. These compositions were compared in the Polyveriform Test with a sample of the oil not containing the antioxidant. Whereas during the test the oil containing no antioxidant increased in acid number to 12.3 and showed an increase in viscosity of 184 percent, the sample containing α,α'-(1,4-piperazinediyl)bis(2,6-di-tert-butyl-p-cresol) showed an acid number of only 2.0 and an increase in viscosity of only 17 percent thus showing a definite improvement over the base oil.

*Example 9*

To 1,000 parts of a solvent-refined neutral oil (95 V.I. and 200 SUS at 100° F.) containing 6 percent of a commercial methacrylate Type V.I. approver which gives the finished formulation of a V.I. of 140 and a viscosity of 300 SUS at 100° F. is added 5 percent of α,α'-(1,4-piperazinediyl)bis(2,6-di-tert-butyl-p-cresol).

*Example 10*

To an additive-free solvent refined crankcase lubricating oil having a viscosity index of 95 and an SAE viscosity of 10 is added 0.001 percent of α,α'-(1,4-piperazinediyl)bis(2-hexyl-6-isopropyl-p-cresol).

*Example 11*

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of α,α'-(1,4-piperazinediyl)bis[2-(α-ethyldecyl)-6-dodecyl-p-cresol]. The resulting oil possesses greatly enhanced resistance to oxidative deterioration.

Example 12

To 100,000 parts of a commercially available pentacrythritol ester having a viscosity at 100° F. of 22.4 centistokes, and known in the trade as "Hercoflex 600" is added 400 parts (0.4 percent) of α,α'-(1,4-piperazinediyl)bis(2-tert-butyl-6-methyl-p-cresol). The resulting finished oil possesses markedly improved resistance against oxidative deterioration.

Example 13

To 100,000 parts of dioctyl sebacate having a viscosity of 210° F. of 36.7 SUS, a viscosity index of 159 and a molecular weight of 426.7 is added 250 parts (0.25 percent) of α,α'-(1,4-piperazinediyl)bis[2-(α-methylhexyl)-6-n-nonyl-p-cresol].

The compounds of this invention are also useful as additives to functional fluids and automatic transmission fluids. The primary constituent of a functional fluid is a refined mineral lubricating oil having carefully selected minimum viscosity of 49 Saybolt Universal Seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl, and mercaptan. The metal atoms may be aluminum, calcium, lithium, barium, strontium and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum of the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together while heating the oil to a temperature up to 200° F.

Example 14

A fluid of this invention is prepared by blending 80 parts of a conventionally-refined Pennsylvania mineral oil (99 SUS at 100° F.), 2 parts of α,α'-(1,4-piperazinediyl)bis(2,6-diisopropyl-p-cresol), 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity at 60/60° F. of 0.919.

Example 15

Another such fluid consists of 95 parts of a solvent-refined, light acid-treated, clay-contacted, solvent-dewaxed paraffin base distillate mineral oil (110 SUS at 100° F.), 0.1 part of α,α'-(1,4-piperazinediyl)bis[2,6-di-(α-ethyloctyl)-p-cresol], 0.1 part of calcium octyl phenol sulfide, 2 parts of a sulfurized sperm oil having a sulfur content between 10–12 percent, a viscosity of 210° F. of 200 SUS and a pour point of 65° F., 0.3 part of an ester of an aromatic acid and wax-alkylated phenol having a molecular weight of approximately 450: 2.5 parts of a linear pale color isobutylene polymer of a controlled molecular weight having a viscosity of 3,000 SUS at 210° F., a specific gravity at 60/60° F. of 0.875.

Liquid hydrocarbon fuels employed in the operation of spark ignition combustion engines are also vastly improved in their storage stability by the practice of this invention. The following examples illustrate compositions of typical commercial gasolines which may be stabilized against oxidative deterioration by the inclusion therein of a compound of this invention.

Example 16

To 1,000 parts of a gasoline containing 26.6 percent aromatics, 20.8 percent olefins, 52.6 percent saturates, and an API gravity of 62.1° is added 10 parts of α,α'-(1,4-piperazinediyl)bis(2-isopropyl-6-methyl-p-cresol).

Example 17

To 10,000 parts of a gasoline containing 8.6 percent aromatics, 7.9 percent olefins, 83.5 percent saturates and an API gravity of 68.5° is added 500 parts of α,α'-(1,4-piperazinediyl)bis(2-n-amyl-6-tert-amyl-p-cresol).

As noted in the preceding examples, the compounds of this invention are excellent antioxidants. This ability to prevent oxidation and deterioration of organic media is completely unexpected since seemingly similar compounds show little or no such antioxidant activity.

The compounds of this invention are also extremely useful as intermediates in the preparation of highly effective thiobenzamide antioxidants. This utility can be attributed to the ability of these compounds to be readily substituted with sulfur on the alpha position of the benzylamine group. Substitution reactions involving the addition of the sulfur atom facilitates the synthesis of highly desirable ortho-substituted thiobenzamides which themselves are excellent antioxidants and, notably, find utility in a wide range of organic media.

A description of the utility of the compounds of this invention as intermediates in the preparation of highly effective thiobenzamide antioxidant compounds can be found in an application entitled "Sulfurized Piperazine Derivatives" by Gordon G. Knapp, filed concurrently with this application. In that application the inventor reveals the reaction of compounds of this invention with sulfur. Thus, the following reaction can occur

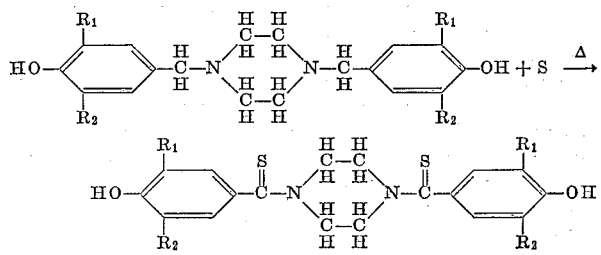

wherein $R_1$ and $R_2$ are as follows Formula I.

The above reaction is illustrated by the following examples.

Example 18

In a reaction vessel equipped with a stirrer, temperature measuring means and heating means were placed 26.1 parts of α,α' - (1,4-piperazinediyl)bis(2,6-di-tert-butyl-p-cresol) and 5.6 parts of sulfur. The mixture was heated to 145°–155° C. for one hour and then allowed to cool to room temperature. The resultant material was then triturated with benzene. The benzene was evaporated and the residue was then titurated with n-hexane and filtered to yield an amorphous orange solid which was triturated with hot ethyl acetate to yield bright yellow α,α'-(1,4-piperazinediyl)bis(3,5 - di-tert-butyl-4-hydroxythiobenzaldehyde), melting point about 270° C. Analysis: Calculated for $C_{34}H_{50}N_2O_2S_2$: 11.0 percent sulfur, 4.81 percent nitrogen. Found: 11.2 percent sulfur, 5.46 percent nitrogen.

The ethyl acetate triturate from the above reaction was concentrated and cooled to yield a small amount of yellow crystalline 3,5-di-tert-butyl-4-hydroxybenzylpiperazine as a by-product, with a melting point of 197–199° C. Analysis: Calculated for $C_{19}H_{30}ON_2S$: 9.59 percent sulfur, 8.38 percent nitrogen. Found: 9.46 percent sulfur, 8.61 percent nitrogen.

Proceeding in the manner of Example 18, good results are also obtained when other benzylpiperazines are reacted with sulfur. For example, α,α'-(1,4-piperazinediyl)bis(2-tert-butyl-6-methyl-p-cresol) can be reacted with sulfur to form α,α'-(1,4-piperazinediyl)bis(3-tert-butyl-5-methyl-4-hydroxythiobenzaldehyde). Likewise, α,α'-(1,4-piperazinediyl)bis[2 - benzyl - 6-(3,5-di-n-hexyl-α-methylbenzyl)-p-cresol] can be reacted with sulfur to form α,α' - (1,4 - piperazinediyl)bis[3 - benzyl - 5 - (3,5 - di-n-hexyl - α - methylbenzyl) - 4-hydroxythiobenzaldehyde]. Also, α,α' - (1,4 - piperazinediyl)bis(2,6 - di - n-eicosyl-p-cresol) can be reacted with sulfur to yield α,α'-(1,4-piperazinediyl)bis(3,5 - di - n - eicosyl-4-hydroxythiobenzaldehyde).

The sulfur-containing compounds prepared from the compounds of this invention are excellent antioxidants for lubricating oil and other organic media.

While the piperazine group and the alpha carbon atom of the benzyl groups have been described without substituents attached thereto it is to be understood that this invention is not restricted to those compounds which are only unsubstituted in those positions but extends also to those compounds where the piperazine group as well as the alpha carbon atom benzyl group have substituents such as alkyl, aryl, cycloalkyl, aralkyl, halogen and nitro groups.

I claim:

1. A compound having the formula:

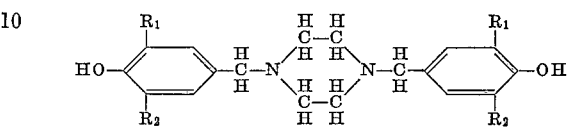

wherein $R_1$ is an alkyl group of from 1–12 carbon atoms and $R_2$ is an alpha-branched alkyl group of from 3–12 carbon atoms.

2. α,α' - (1,4-piperazinediyl)bis(2,6 - di - tert-butyl-p-cresol).

3. α,α' - (1,4 - piperazinediyl)bis(2-tert-butyl-6-methyl-p-cresol).

4. α,α' - (1,4 - piperazinediyl)bis(2,6 - diisopropyl - p-cresol).

References Cited by the Examiner

UNITED STATES PATENTS

| | | | |
|---|---|---|---|
| 2,304,729 | 12/1942 | Bruson | 260—268 XR |
| 2,800,452 | 7/1957 | Bondi et al. | 252—51.5 |
| 2,805,998 | 9/1957 | Cantrell et al. | 252—51.5 |
| 2,870,152 | 1/1959 | Schusteritz et al. | 260—268 |
| 2,927,924 | 3/1960 | Mills | 260—268 |
| 2,997,474 | 8/1961 | Janssen | 260—268 |
| 3,000,891 | 9/1961 | Janssen | 260—268 |
| 3,000,892 | 9/1961 | Janssen | 260—268 |

OTHER REFERENCES

Bizard et al.: Compt. Rend. Soc. Biol., 145, pages 1303–5 (1951).

Lespagnol et al.: Compt. Rend. Soc. Biol., 143, pages 1038–9 (1949).

Mercier et al.: Compt. Rend. Soc. Biol., 142, pages 364–5 (1948).

NICHOLAS S. RIZZO, *Primary Examiner.*

IRVING MARCUS, JOHN D. RANDOLPH,
*Examiners.*